3,282,867
WATER BASE INTERPOLYMER COATINGS
Eldon E. Stahly, Birmingham, Oscar M. Grace, Madison Heights, and Oliver W. Burke, Jr., Grosse Pointe Park, Mich.; said Stahly and said Grace assignors to said Burke
No Drawing. Filed Nov. 23, 1959, Ser. No. 854,560
5 Claims. (Cl. 260—17)

This invention relates to new and improved latex coating compositions commonly termed water-base coatings. More particularly this invention pertains to interpolymer latex or water-base compositions essentially free of or very low in emulsifier content. Further, this invention pertains to formation of essentially water impermeable continuous polymer films.

It is well known that usual water-base coating compositions containing emulsifiers give a coating with variable water permeability and usually poor adhesion to metals. When coatings of several layers are required the subsequent coats can adhere to the first coat when there is sufficient water permeability to permit deposition of polymer particles in the pores and interstices of the preceding polymer film deposit, such water permeability precluding water resistance; hence when good adhesion of films from latex polymers has been obtained in prior art, the films do not have good water resistance.

Also, in the prior art it was known that vinylidene halide copolymers such as vinylidene chloride-acrylonitrile copolymers are highly impervious to water. Such polymers (about 15% acrylonitrile content) could be prepared in relatively low molecular weight form and when dissolved in a solvent such as methyl ethyl ketone and the solution applied to surfaces by brushing or spraying, a flexible-film coating impervious to water was obtained.

To eliminate pin-holes a multi-layer coating was built up to a film thickness of about 0.006 inch.

The hazard of toxicity and fire in spraying, brushing and drying such coatings was a prohibitive disadvantage for many applications. Consequently, attempts have been made to prepare such polymers in latex form. Heretofore such polymers when prepared in latex form were higher in molecular weight and did not produce flexible coatings of sufficient water resistance. Incorporation of plasticizers gave flexible films from which the plasticizer was eventually leached out, allowing water penetration through the pores remaining from leaching of the plasticizer.

The present invention among other things provides water-base or latex polymer coating compositions with from 0.0 to about 0.5% by weight added emulsifiers based on dry polymer content by weight and such aqueous coating compositions upon drying form flexible water-resistant films. It further provides said flexible polymer compositions as latices which have good adhesion to metals, especially iron and steel, as well as to wood and plastic materials, particularly to itself in the dried film form. Also, the present invention, by a sequential polymerization process consisting of two or more polymerization steps, provides such latices with high polymer solids content with which conventional pigments of both inorganic and organic types can be incorporated if desired by use of a minor amount of an appropriate surface-active agent, and further, such latices with or without pigment can be bodied to a consistency desired for either brush or spray application by use of less than 1% by weight of bodying agents based on dry polymer solids and such thickening or bodying agents include hydroxyethylcellulose, carboxymethylcellulose, methoxycelluloses, polyacrylamides, polyacrylic acids, natural gums including tragacanth, and the like.

The present invention further provides a rapid-drying high-solid content, pigmented, bodied and plasticized latex wherein the external plasticizer incorporated is per se a swelling agent for the polymer, or the plasticization is effected by internal plasticization by inclusion of a plasticizing monomer in the polymerization step of forming the polymer latex.

Finally the present invention provides in latex form an interpolymer which is film-forming and films therefrom are water resistant, resistant to organic solvents including hydrocarbon solvents, alcohols and chlorinated solvents, and the present invention provides said interpolymer latex in a readily pigmented high-solid content form which can be brushed or sprayed on a metal surface to form a multi-layer protective coating which will protect the surface against corrosion by water and/or solvents. Specific exemplification of such a latex composition comprises an interpolymer wherein a monomer mixture comprising vinylidene chloride (85% by weight) and acrylonitrile (15% by weight) is polymerized with potassium persulfate-sodium bisulfite catalyst system in the presence of a latex of prepolymerized butadiene-acrylonitrile (50 to 75% by weight butadiene) essentially emulsifier-free prepared with the same catalyst system, the butadiene-acrylonitrile copolymer constituting less than 50% by weight of the total interpolymer content of the final latex, and up to a maximum of 0.5% by weight of emulsifier (based on the total dry weight of the interpolymer) being present in the polymerization mixture. Such a latex although comprising a major portion of a rigid polymer (vinylidene chloride-acrylonitrile copolymer) forms a flexible film upon drying as a result of the interpolymerization with the minor portion of the flexible elastic polymer (the butadiene-acrylonitrile copolymer in this example). Such an interpolymer latex prepared to high polymer solids content (about 40 to 60%) is pigmented with iron oxide, lead cyanamide, clay, titania, mica and silicon dioxide type fillers or other conventional pigments by incorporating on the order of 10 to 40 parts by weight of such pigment per 100 parts by weight of the interpolymer. The pigment can be combined, e.g., "stirred in," in the form of an aqueous suspension (about 55% pigment) obtained with the addition of 0.1 to 0.5 part by weight of an emulsifier based on the weight of pigment used. Useful emulsifiers include the alkali metal salt of polymerized alkylnaphthalene sulfonic acid (Daxad #11). The latex-pigment mixture if necessary may then be bodied to the consistency desired for brushing or spraying by stirring in with mild agitation a solution of a bodying agent such as hydroxyethylcellulose or a polycarboxypolymer (e.g., Carbopols) or polyacrylamide (from 1 to 5% in water) to constitute from 0.05 to 1.0 part by weight of said bodying agent per 100 parts by weight of polymer. The pH of the final bodied pigmented latex if below 7 is adjusted to 7 to 7.5 by addition of small amounts of aqueous ammonia to assure storage stability. Other pigments which can be used to pigment the interpolymer latices of the present invention include the inorganic and organic types described in chapter 8 of "Organic Protective Coatings" by Von Fischer and Bobalek, Reinhold Publishing Corporation, New York, 1953.

One of the problems to be solved by use of protective coatings of the present invention is the protection of steel fuel tanks of seagoing tankers, etc., from corrosion attack by (a) fuels carried therein and by (b) sea water used as ballast and to displace the fuel upon discharging, the steel surfaces being alternately exposed to the fuel and sea water. Since certain fuels have alcohol components, resistance to fuels means resistance to aliphatic, aromatic, and naphthenic hydrocarbons and also to alcohols. Vinylidene chloride-acrylonitrile low molecular weight resins when dissolved in ketone solvents and applied in 5 or 6 successive coatings to the insides of such tanks have shown high resistance to both fuel and sea water. The hazards, both of toxicity and fire are drawbacks to usage of solvent type coatings. The present invention therefore by providing a water-base, high-solids latex of film-forming interpolymers, including among others, the vinylidene chloride-acrylonitrile-containing polymers, makes possible the protection of metal surfaces by polymer coatings, and thus solves an important problem, i.e., the safe procedure of coating for protecting metals against solvents and sea water.

One of the problems of producing high solids latices of such vinylidene chloride film-forming copolymers is the prevention of considerable prefloc formation when only trace amounts of emulsifier are employed in the polymerization. As pointed out hereinbefore the use of normal amounts of emulsifier for latex polymerizations, leads to polymer films which have low water resistance, being leached out leaving open capillary paths for water penetration.

The present invention provides a two-step, three-step, or multi-step polymerization employing from 1 to 50 parts by weight of a water soluble monomer such as acrylonitrile or methacrylonitrile, acrolein, etc., with 50 to 99 or more parts by weight of other monomers in the first step; the acrylonitrile in amounts from 10 to 50 parts by weight has the advantage of introducing oil-resistance into the interpolymer and is especially advantageous in essentially emulsifier-free systems to produce stable latices under conditions of rapid polymerization. Other monomers useful in this connection are crotonaldehyde, methacrolein, acrylamide, acrylic acid, methylmethacrylate, methylvinylketone, methylvinylether and the like. It is possible to produce emulsifier-free stable vinylidene interpolymers and copolymers without the inclusion of such water-soluble monomers but the reaction time is prohibitively long, up to a week, to obtain reasonable or practical conversion of monomers, while inclusion of a water-soluble monomer, e.g., acrylonitrile, together with an emulsifier in an amount up to its critical micelle concentration gives complete polymerizations of monomers in from 1 to 5 hours.

The use of emulsifiers slightly below the critical micelle concentration, that is, no micelle formation, and the use of emulsifiers exceeding the critical concentration and up to concentrations of about 1% gives only negligible micelle formation, and restricts the number of polymerization initiation centers, thus permitting polymerization to proceed by growth of a limited number of polymer particles. The final product thus can be a stable large-particle latex system, up to as high as 5000 Angstrom units average diameter, which is desired for high solids coating systems.

The use of a multi-step polymerization procedure permits step-wise building up of the interpolymer solids content of the latex to the range of 40 to 60% by weight without prohibitive prefloc formation. With proper selection of monomers and polymerization catalysts a two-step process gives 40 to 50% by weight polymer solids content which is satisfactory for use in preparing a pigmented bodied latex for either brush or spray application. Certain monomers combinations, particularly those containing vinylidene fluoride may require three-step polymerization to arrive at the high content of interpolymer solids desired.

In the practice of the present invention it is required that in at least one of the polymerization steps, preferably in the last one, a monomer mixture be polymerized to produce a flexible polymer component so that the total interpolymer product of the process whether graft or block or mixed interpolymer will be flexible and film-forming. By flexible is meant the film can be bent to a 15° angle without breaking. To illustrate this requirement attention is called to the specific exemplification hereinbefore mentioned; the first step therein was the preparation of the flexible butadiene-acrylonitrile copolymer as a latex in which the second step was conducted to polymerize a vinylidene chloride-acrylonitrile monomer mixture. The final interpolymer product formed a flexible tough film when dried, yet over half of the interpolymer film comprised the vinylidene-acrylonitrile component which per se is a rigid copolymer when prepared in the absence of the butadiene-acrylonitrile polymer latex.

Thus by interpolymer is meant the polymer products obtained when a monomer mixture is polymerized in the presence of a preformed polymer latex. The term also includes the product from three steps wherein a third monomer mixture is polymerized in the presence of the interpolymer latex from the second step. It is possible to practice the present invention by use of the same monomer in different proportions in each of the successive steps of polymerization, e.g., with vinylidene chloride-acrylonitrile mixtures. The first step for example may consist of polymerizing 22.5 parts by weight of a mixture of 85% by weight of vinylidene chloride mixed with 15% by weight of acrylonitrile in 77 parts by weight of water containing 0.1 part by weight of an emulsifier such as sodium decylbenzene sulfonate and as catalyst for the polymerization at 60° C., 0.3 part of potassium persulfate, had 0.2 part by weight by sodium bisulfite, the reaction time being 2 hours to substantially complete conversion of monomers. The polymer content complete conversion of monomers. The polymer content of the latex is 22.5% and the film formed, by drying this latex, is rigid and brittle. Addition of 22.5 parts by weight of a mixture of 92% by weight vinylidene chloride and 8% by weight acrylonitrile to the total latex from the first step together with 0.3 part by weight potassium persulfate and 0.2 part by weight of sodium bisulfite produces an interploymer latex under the same conditions of time and temperature similar to those employed in the first step, whereby the product latex contains 45% by weight polymer solids and forms a flexible water-resistant and fuel-resistant film upon drying. If desired to have a still higher solids content a third polymerization step can be run employing 0.1 part by weight of the sodium salt of dodecyl sulfate, Duponol ME, a trademark product, with a mixture of monomers, vinylidene chloride and acrylonitrile, in the same or similar relative proportions as either one of the charges for the first or second step, but the amount of monomers in the third step should be adjusted so that the final solids is not over 60% since larger amounts are accompanied by the development of prefloc.

Another procedure of the present invention utilized 4 or more polymerization steps with a different monomer mixture polymerized in each successive step. In this manner 12 to 15% solids can be developed in each step so that the final interpolymer latex can contain between 45 and 60% solids. To exemplify this procedure the following four mixtures were polymerized in successive sequential steps starting with 50 parts water containing 0.15 part by weight of polymerized alkylnaphthalene sulfonate (Daxad #11, trademark product).

| STEP: | Monomers (parts by weight)* |
|---|---|
| 1 | 9 parts vinylidene chloride and 3 parts acrylonitrile. |
| 3 | 10 parts vinylidene chloride and 2.5 parts acrylonitrile. |
| 4 | 9 parts vinylidene chloride and 1 part acrylonitrile. |
| 2 | 8 parts butadiene and 4 parts acrylonitrile and 2 parts vinylidene fluoride. |

*In each of the 4 steps 0.25 pt. by weight of potassium persulfate and 0.12 part by weight sodium bisulfite were used.

Similarly five- and six-step interpolymers are possible to produce latices for forming water- and solvent-resistant coatings. In the above example the same monomer-components can give a brittle film or a flexible film when run in conventional one-step polymerizations depending on the proportions of the two monomers polymerized. Thus vinylidene chloride mixed with from 15 to 99% by weight acrylonitrile gives a copolymer which forms a brittle film; vinylidene chloride mixed with from 7 to 13% by weight acrylonitrile produces a copolymer which forms a flexible film; finally vinylidene chloride mixed with from 0 to 6% by weight acryonitrile produces a polymer again in the brittle film-forming range.

The amount of film-forming polymer components should be less than 50% by weight of the interpolymer preferably from 15 parts to 50 parts by weight, the specific minimum amount depending on the amount required to make the interpolymer flexible and film-forming, while the maximum amount (50%) is established by the amount of the monomers, which per se form rigid or brittle polymers, required for solvent and water resistance of the interpolymer. The water and solvent resistance of the final interpolymer film are decreased by the presence of emulsifiers, external plasticizers, bodying agents, salts, and the like. Thus a minimum of such components should be present for best performance of the film. In some instances external plasticizers in the amount less than 5% by weight based on the interpolymer content are found useful in the film to develop flexibility and complete surface-coverage of metals, as well as to avoid "pin-holing" in the multilayer coating. Examples of such plasticizers are dibutyl phthalate, dioctylphthalate, diisobutyl adipate, butyl stearate, tributyl phosphate, acetyltributylcitrate, n-butylbenzylphthalate, 2-ethyl-hexyl-diphenylphosphate, n-butyl-phthalate-r-butyl glycolate ester, dibutyl itaconate, dioctyl sebacate, and the chlorinated biphenyls. However, such external plasticizers can be slowly leached out of a film when such film is in contact with water or solvent, therefore it is preferred to plasticize by incorporating a polymeric plasticizer into the interpolymer. Such internal plasticization is accomplished by introducing a monomer component (capable of adding flexibility to the rigid polymer) into the polymerization step comprising the polymerization of the brittle or rigid polymer-forming monomers, which carry the properties of water and solvent resistance. Thus vinylidene chloride-acrylonitrile or vinylidene fluoride-acrylonitrile (85/15) are polymerized in a first step to a copolymer which has good water and solvent resistance but is brittle. For the latter mixture a salt of a perfluoroacid, e.g., ammonium perfluoro-caprylate, up to 5% on the monomers, is beneficial for producing a stable latex. A second monomer mixture is then polymerized in the latex, said monomer mixture being, for example, vinylidene chloride-acrylonitrile-dibutyl fumarate (10/5/10) or butadiene-acrylonitrile (30/20) to give an interpolymer having film-forming properties and resistance to water and solvents, flexibility and self-adhesion, and enduring properties, i.e., is not leachable by water or fuels. In the above example the butadiene and dibutyl furmarate are considered to be the internal plasticizing polymer components of the interpolymer.

*Further examples of interpolymers*

Table I lists a number of illustrative compositions polymerized by the process of the present invention to form interpolymeric products thereof.

TABLE I

Examples of monomer mixtures polymerized in the first and second steps of the emulsion process of the present invention (catalyst 1.0 pt. potassium persulfate and 0.5 pt. sodium sulfite by wt. per 100 pts. monomers); pts. water/pt. Daxad 11 given on second line of each example.

| Ex. | First Step (parts)[1] | Second Step (parts)[1] |
| --- | --- | --- |
| 1 | BD-AN (30-20) (F) 85/0.15 | $VCl_2$-AN (90-10) (F) 93/0.11 |
| 2 | $VCl_2$-EA (90-10) (F) 400/0.5 | $VCl_2$-AN (170-30) 0.0/0.0. |
| 3 | $VCl_2$-MMA-EA (90-10-10) (F) 200/0.5. | $VCl_2$- (50) 0.0/0.0. |
| 4 | $VCl_2$-AN (90-10) (F) 125/0.31 | BD-AN (30-20) (F) 5/0.12. |
| 5 | $VCl_2$-AN-DBP (80-20-10) (F) 125/0.28. | $VCl_2$-AN-DBF (85-15-20) (F) 100/0.2. |
| 6 | $VCl_2$-AN-EHA-I (90-10-10-2) (F) 137.5/0.39. | $VCl_2$-AN (90-10) (F) 100/0.2. |
| 7 | $VCl_2$-AN-DBF (90-10-5) (F) 125/0.31. | $VCl_2$-AN-BOEA (22.5-2.5-7.5) (F) 25/0.12. |
| 8 | $VCl_2$-AN-DBF (85-15-5) (F) 125/0.31. | BD-AN-EHA (10-10-10) (F) 15/0.15. |
| 9 | $VCl_2$-AN-DBF (90-10-5) (F) 125/0.31. | BD-AN-DBF (10-5-10) (F) 15/0.12. |
| 10 | $VCl_2$-AN (85-15) 137.5/0.23 | $VCl_2$-AN-DBF (90-10-20) (F) 0.15/0.15. |
| 11 | $VCl_2$-AN (90-10) (F) 125/0.31 | $VCl_2$-AN-EHA (45-5-20) (F) 15/0.5. |
| 12 | $VCl_2$-AN (80-20) 125/0.3 | $VCl_2$-HMA (50-50) (F) 14.5/0.2. |
| 13 | $VCl_2$-AN (80-20) 200/0.31 | $VCl_2$-BMA (50-50) (F) 14.5/0.2. |
| 14 | $VCl_2$-AN (80-20) 125/0.31 | $VCl_2$-CHMA (60-40) (F) 14.5/0.2. |
| 15 | $VCl_2$-AN (85-15) 150/0.23 | $VCl_2$-AN-MAN (90-5-5) (F) 50/0.39. |
| 16 | $VCl_2$-AN (85-15) 125/0.3 | BD-AN (15-15) (F) 5/0.12. |
| 17 | $VCl_2$-AN (80-20) 200/0.0 | BD-AN (22.5-22.5) (F) 15/0.15. |
| 18 | $VCl_2$-AN (90-10) (F) 125/0.31 | BD-AN-$VCl_2$ (20-10-10) (F) 15/0.15. |
| 19 | $VCl_2$-AN (90-10) (F) 125/0.31 | BD-AN-$VCl_2$ (20-10-10) (F) 15/0.15. |
| 20 | $VCl_2$-AN (90-10) (F) 125/0.3 | BD-AN-$VCl_2$-DBF (15-5-5-2.5) (F) 15/0.15. |
| 21 | $VCl_2$-AN (90-10) (F) 125/0.31 | BD-AN-EHA (40-10-10) (F) 15/0.5. |
| 22 | $VCl_2$-AN (85-15) 150/0.23 | AN-I (20-20) (F) 50/0.2. |
| 23 | $VCl_2$-AN (90-10) (F) 150/0.23 | BD-AN-$VCl_2$-DBP (15-5-5-5-7.5) (F) 15/0.15. |
| 24 | $VCl_2$-AN (85-15) 125/0.31 | BD-AN-$VCl_2$-ARO (7.5-5-5-7.5) (F) 15/0.15. |
| 25 | $VCl_2$-VCl-AN (75-10-15) 125/0.4. | BD-AN-DBF (20-20-10) (F) 15/0.10. |
| 26 | $VCl_2$-AN (90-10) (F) 125/0.31 | BD-AN-$VCl_2$-DBF (15-5-5-7.5) (F) 15/0.15. |
| 27 | $VF_2$-AN (90-10) (F) 125/0.5 | BD-AN (15-10) (F) 10/0.1. |
| 28 | $VF_2$-AN (90-10) (F) 150/0.5 | BD-$VF_2$-AN (15-10-5) (F) 10/0.15. |

[1] Abbreviations are as follows: AN=acrylonitrile, BD=butadiene-1,3, EA=ethylacrylate, EHA=2-ethylhexyl acrylate, DBF=dibutylfumarate, BMA=butyl methacrylate, HMA=hexylmethacrylate, BOEA=butoxyethyl acrylate, MAN=methacrylonitrile, CHMA=cyclohexylmethacrylate, $VCl_2$=vinylidene chloride, VCl=vinyl chloride, DBP=dibutyl phthalate, ARO=Arochlor 1221 (chlorinated biphenyl), $VF_2$=vinylidene fluoride, (F) denotes flexible polymer component of interpolymer, I=isoprene.

In each example of Table I, the second step polymerization was conducted in the latex from the first step, i.e., the monomers, water, Daxad 11, and additional catalyst (in the amount specified in the table heading) were added to the latex of the first step and polymerization was continued.

In Table I the partially water-soluble monomers are acrylonitrile and methacrylonitrile, the most effective monomers producing essentially emulsifier free interpolymers of the present invention; others which are less water soluble, in Table I, and still active in eliminating the need for the conventional amounts of emulsifier are methylmethacrylate, ethylacrylate, and butoxyethylacrylate. The polymerizations in Table I were all conducted at about 60° C. until monomer polymerizations were essentially quantitative (as determined by sampling and determination of percent by wt. of solids in the latex). The reactions times varied from 1.5 to 18 hours.

Thus each step of the process of the present invention may polymerize a mixture of 2 to 4 monomers; the first step must have two monomers one of which is water soluble, and the subsequent steps may polymerize one or more monomers in each step.

All of the two-step interpolymers of Table I have been prepared in the form of latices containing from 0 to 0.5% by wt. emulsifier (e.g., Daxad #11, a polymerized alkylnaphthalene sulfonate) and 40 to 45% by wt. polymer solids. It was discovered that all of these latices could be built up to from 50 to 60% solids by addition of more catalyst (e.g. potassium persulfate-sodium sulfite) and a third monomer mixture (10 to 20 parts by wt.) such as vinylidene chloride (80 to 90% by wt.) and acrylonitrile (10-20% by wt.). Larger amounts of emulsifier do not interfere with polymerization, but in general are not desired in the protective coating produced therefrom for reasons of lower water resistance of the films from the polymer thereof, hereinbefore discussed.

In Examples 23 and 24 dibutylphthalate and chlorinated biphenyl (Arochlor 1221) respectively were employed as external plasticizers. It was found advantageous to add these plasticizers with the monomer mixtures. Although they have no polymerizable groups present, it appears that they become partially bound in the interpolymer possibly by free-radical linking and bonding mechanisms.

Although potassium persulfate-NaHSO$_3$ (1 pt./0.5 pt.) was used as catalyst in all the examples of Table I, other free radical generating systems catalyst systems were found useful in polymerizing the interpolymers of this invention. Typical systems employed in this invention are, on the basis of 100 parts monomers:

| Catalyst: | Parts (by wt.) |
|---|---|
| (a) Potassium persulfate | 0.2 to 1.5. |
| Sodium bisulfite | 0.1 to 0.75. |
| (b) Potassium persulfate | 0.2 to 1.5. |
| Sodium bisulfite | 0.12 to 0.25. |
| Sodium bicarbonate | 0.25 to 0.5. |
| (c) Azobis (isobutyronitrile) | 1.0. |
| (d) Diisopropylbenzene hydroperoxide | 1.25. |
| Potassium pyrophosphate | 0.21. |
| Ferrous sulfate | 0.19. |
| Dodecylmercaptan | 0.1. |
| (e) Benzoyl peroxide | 1.0. |
| (f) Diisopropylbenzene hydroperoxide | 1.0. |
| Tetraethylenepentamine | 0.2. |
| (g) Cumene hydroperoxide | 1.5 to 3.0. |
| Triethylenetetramine | 1.5 to 3.0. |
| (h) Ammonium persulfate | 0.5 to 1.0. |
| Tert.-dodecyl mercaptan | 0 to 0.1. |
| Sodium bisulfite | 0.25 to 0.5. |

Many other similar catalyst systems were found satisfactory, for example, other organic peroxides such as t-butyl hydroperoxide, dicumyl peroxide, and tert.-butyl perbenzoate can be used instead of above shown peroxides. Hydrogen peroxide also was found useful instead of the potassium persulfate in the above latex formulas, but when hydrogen peroxide is used the pH of the system should be kept below 7 for best results.

The trace amount of emulsifier, usually employed in amount up to the critical micelle concentration (i.e., the point of incipient micelle formation) and usually less than 0.3 part based on total water present, may be of the usual types exemplified by the following: alkyl sulfates (e.g., Duponol ME and Emulgator K-30), sodium alkylbenzene sulfonate (e.g., Ultra Wets), alkyl naphthalene sulfonates and polymeric forms thereof (e.g., Daxad #11, Alrosperse 40K, Aerosol OS, Dianol ANS, and Alkanol B), alkyl sodium sulfosuccinates (e.g., Aerosol- OT and -22), soaps (e.g., alkali metal salts of fatty acids), polymeric emulsifiers (e.g., Lustrex, Arolon 110, ammonium salt of styrene-maleic anhydride copolymers, and of vinyl chloride maleic anhydride copolymers, Darvan #1, a polymeric sulfonate), quaternary ammonium chlorides (Katapone VV-338), the polyoxyethylated nonylphenyl surfactants (e.g., Igepals) and many other surfactants which are known to be useful in larger amount for emulsion polymerizations.

*Preparation of pigmented latices*

The latices resulting from the polymerizations of monomers of Table I as well as the latices prepared by additional polymerization steps conducted in those latices may be pigmented and bodied to a viscosity adapted to both brush and spray applications. Such coating compositions are exemplified by the examples of Table II. Fifty parts of the pigments were converted into a water suspension using from about 0.5 to 1.0 part by wt. of a surface active agent such as polymerized alkyl naphthalene sulfonate and about 40 parts by wt. of water. Equally effective as (Daxad #11) were polymeric emulsifiers prepared from vinylchloride and maleic anhydride (mole/mole), and styrene and maleic anhydride (mole/mole) and a water dispersible drying oil #3952E. The pigment and water solution were ground in a pebble mill for about 24 hours, and the suspension was added in the desired amount (10 to 30 parts by wt. pigment per 100 parts polymer) to the interpolymer latex and the resultant mixture was further mixed with mild agitation by stirring. A solution of a bodying agent (e.g., 1% by wt.) solution. A hydroxyethylcellulose (Cellosize WP-4400) was blended with mild stirring until a viscosity suitable for applications resulted. In some cases the last step also incorporated from 2 to 5 parts of a plasticizer. The proper viscosity was judged by spray-testing to determine when "running and sagging" of the sprayed composition was eliminated. It was found to be non-critical whether the bodying agent was added prior to the pigment, once the required amount of bodying agent was established.

TABLE II

*Typical examples of coating compositions of the present invention (parts based on 100 parts interpolymer from Table I)*

| Interpolymer Latex No. From Table I | Parts Daxad No. 11 | Pigments Incorporated (pts.) | Parts Water | Bodying Agent (pts.) | Plasticizer Present (parts) |
|---|---|---|---|---|---|
| 18 | 0.12 | Dixie Clay (10), Iron oxide Red-S (2) | 10 | Polyacrylamide-200 (0.9) | None. |
| 18 | 0.1 | Wollastonite P-1 (5), Titania R-510 (5). | 9 | Polyacrylamide 200 (0.5) | Do. |
| 23 | 0.12 | Dixie Clay (10), Iron Oxide Red-S (2) | 10 | Polyacrylamide 200 (0.9) | Dibutyl phthalate (2). |
| 23 | 0.10 | Wollastonite P-1 (5), Titania R-510 (5). | 9 | Polyacrylamide 200 (0.5) | Do. |
| 20 | 0.12 | Dixie Clay (10), Iron Oxide Red-S (2) | 10 | Polyacrylamide 200 (0.8) | None. |
| 20 | 0.10 | Wollastonite P-1 (5), Titania (5) | 9 | Polyacrylamide 200 (0.5) | Do. |
| 24 | 0.12 | Dixie Clay (10), Iron Oxide Red-S (2) | 10 | Polyacrylamide 200 (0.5) | Arochlor No. 1221 (6). |
| 21 | 0.06 | Dixie Clay (10), Iron Oxide Red-S (2), Sodium phosphate (0.04). | 10 | Cellosize WP-4,400 (0.1) (Hydroxyethylcellulose). | None. |
| 12 | 0.05 | Iron Oxide Red-S (10), Sodium phosphate (0.02). | 9 | Cellosize WP 4,400 (0.1) | Do. |
| 16 (75%)+Step 1 of 5 (25%) | 0.15 | Wollastonite P-1 (15), Orange Toner (1.5). | 15 | Polyacrylamide-50 (0.15), and Carbophthalate pol-939 (0.2) (Polycarboxypolymer). | Dibutylphthalate (2.1). |
| 16 (75%)+Step 1 of 5 (25%) | 0.4 | Lead Cyanamide (30) | 30 | None | Do. |
| 10 | 0.4 | Iron Oxide Red-S (30), Wollastonite P-1 Potassium pyrophosphate (0.2). | 50 | Cellosize WP-4,400 (0.08) | None. |
| 10 | 0.3 | Pigment Green B (40) | 40 | Cellozize WP-4,400 (0.1) | Do. |
| 10 | 0.05 | Blue Paste B (10) | 100 | Benagel (National Lead) (0.3) | Do. |
| 9 | 0.05 | Blue Paste B (10) | 100 | Benagel (0.3) | Do. |

TABLE II—Continued

| Interpolymer Latex No. From Table I | Parts Daxad No. 11 | Pigments Incorporated (pts.) | Parts Water | Bodying Agent (pts.) | Plasticizer Present (parts) |
|---|---|---|---|---|---|
| 5 | 0.3 | Pigment Green B (40) | 40 | Cellosize WP-4,400 (0.08) | Dibutylphthalate (5). |
| 8 | 0.1 | Dixie Clay (15), Permansa Yellow (0.75). | 15 | Cellosize WP-4,400 (0.05), Polyacrylamide-50 (0.45). | None. |
| 8 | 0.1 | Iron Oxide Red-S (10), Sodium phosphate (0.04). | 9 | Cellosize WP-4,400 (0.1), acrylamide-50 (0.05). | Do. |
| 11 | 0.1 | Wollastonite P-1 (5), Titania R-510 (5). | 9 | Cellosize WP-4,400 (0.1), Polyacrylamide-50 (0.4). | Do. |
| 7 | 0.06 | Iron Oxide Red-S (10), Sodium Phosphate (0.02). | 9 | Cellosize WP-4,400 (0.1) | Do. |
| 1 (75%)+Step 1 of 5 (25%). | 0.4 | Lead Cyanamide (30) | 25 | None | Dibutylphthalate (2.1). |
| 15 | 0.3 | Iron Oxides Red-S (35) | 30 | Polyacrylamide-75 (0.1) | None. |
| 3 | 0.2 | Red Paste TPF (10), Dixie Clay (10) | 30 | Benagel (0.3) | Dibutylphthalate(2). |
| 26 | 0.04 | Red Paste TPF (5), Dixie Clay (5) | 15 | Benagel (0.3), Cellosize WP-4,400 (0.07). | None. |
| 28 | 0.3 | White Lead (15), Red Lead (15) | 25 | Cellosize WP-4,400 (0.1) | Do. |

The examples of Table II are illustrative of the several hundred of latex coating compositions prepared according tot he procedures of the present invention. Pts. in every case were pts. by weight.

The amounts of pigments used in relation to the amount of interpolymer in the latex composition is in the range from about 3 parts by weight per hundred parts of interpolymer to about 150 pts. or more by weight per hundred parts of interpolymer. The low range may be useful where tinting and gloss effects are desired; the intermediate amounts, from about 5 to 60 pts. are useful where deeper colors, anti-corrosion properties or improved water resistance are desired; and the high loading up to 150 pts. or more are often useful in primary coatings for improved adhesion (of subsequent coatings) and to permit buffing prior to later coating applications.

The testing was conducted by spray-coating or brush coating steel panels (3" x 5" x ⅛") which after drying were sandblasted and washed with Parco #250 cleaner (phosphoric acid type) just prior to coating with our interpolymer compositions. Use of a wash primer pretreatment with Navy Standard Formula No. 117 was not found to improve the performance of the coatings applied to the panels after such treatment (Formula 117 comprised a mixture of an alcoholic solution of polyvinylbutyral resin, zinc chromate, magnesium silicate, and phosphoric acid). From 2 to 6 coatings of latex were applied with intervening drying periods of at least one hour to avoid water entrapment in the inner layer or layers. The number of coats applied was adjusted so that the final film-thickness was from 5 to 10 mils. While all of these latex compositions could be bodied sufficiently to attain up to 10 mil films with a single spray application, it is preferable to use at least two coatings, so that the chances of continuous pin-holes or pores through the film coating are eliminated.

The coated panels were dried for about 24 hours after the final coat application and then tested by:

*Test A.—Comprised the following steps*

(1) Immerse panels for 7 days at 130° F. in a 3.3 percent by wt. solids containing synthetic seawater solution (comprising 0.75 g. KCl, 3.4 g. KBr, 42.0 g. $MgCl_2.6H_2O$, 8.3 g. $CaCl_2.6H_2O$, 87.2 g. NaCl, 30.4 g. $Na_2SO_4.10H_2O$ dissolved in distilled water to a total of one gallon of solution).

(2) Immerse panels for 7 days at 130° F. in 3.3 percent synthetic seawater solution as in Step 1 plus a 60/40 blend of aviation gasoline and aromatic solvents comprising a blend of 60 vol. of 115/145 aviation gasoline, 20 vols. toluene, 15 vols, xylene, and 5 vols. of benzene (each panel is exposed to air, solvents and seawater simultaneously).

(3) Immerse panels in above 3.3 percent synthetic seawater solution plus 115/145 aviation gasoline for a period of seven days at 130° F. (the panel is exposed to air, gasoline and seawater simultaneously).

(4) Immerse panels in above 3.3 percent synthetic seawater solution plus JP-5 jet fuel for a period of seven days at 130° F. (each panel is exposed to air, fuel and seawater simultaneously).

(5) Immerse panels in above 3.3 percent synthetic seawater solution plus diesel oil for a period of seven days at 130° F. (each panel is exposed to air, oil and seawater simultaneously).

*Rating of Panels.*—0=no rust and no coating failure; 10=complete surface rust and/or coating failure.

The test was carried out by immersing the coated panels in battery jars containing the solutions employed for each step. The jars were then placed into a constant temperature bath at the desired (130° F.) temperature. A five-day immersion with a two-day drying period was employed.

*Test B.—Comprised the following steps*

*Step 1, synthetic sea water immersion for one week.*—Immerse panels totally for one week at room temperature in above 3.3 percent by wt. total solids synthetic sea water solution.

*Step 2, aromatic fuel immersion for one week.*—Following the seat water immersion, immerse panels totally for one week at room temperature in a 40% by wt. aromatic synthetic gasoline comprising a blend of 50 vols. aliphatic petroleum naphtha, 20 vols. toluene, 15 vols. xylene, and 5 vols. benzene.

*Step 3, hot sea water immersion for two hours.*—(This operation and the operation following were intended to simulate conditions encountered in the use of Butterworth tank cleaning and devaporizing equipment.) Following fuel immersion, immerse panels totally in hot synthetic sea water for two hours at 175° F.

*Step 4, hot sea water spray for ten seconds.*—Following the hot synthetic sea water immersion, place each panel within a suitable closed container and opposite a 3/16 spray nozzle set at a distance of 2½ feet from the panel face. At a nozzle pressure of 25 p.s.i., spray each panel dead center with a blast of hot synthetic sea water (175° F.) for a period of ten (10) seconds.

*Note.*—Operations (1) to (4) constitute one (1) complete test cycle. This cycle is repeated and coating is expected to surpass 10 such cycles without failure. An unsatisfactory coating will show failure within 10 cycles.

*Rating of Panels.*—0=no rust and no coating failure, 10=complete surface rust and/or coating failure.

In the later stages of the test following the 10th cycle the above test was modified by reducing the immersion time for steps one and two to three days each while steps three and four remained the same.

*Coated panel test results*

The panels coated with the latices of interpolymers shown in Tables I and II were tested using Tests A and B above outlined. For comparison many single-stage polymer coatings were tested including coatings prepared from each individual polymerization step of Table I, i.e., without interpolymerization. The results showed that all polymers derived as single-stage polymerization products gave coating failures in the first few cycles (a rating of 10 on the rating scale of the tests), whereas the interpolymer coatings of this invention showed a rating of 0–2 in tests (A) and (B), zero indicating no rust and no coating failure, 1 to 4 rating being a useful coating with slight rust, 5 to 9 showing increasing rust and 10 denoting complete surface rust and/or coating failure.

The following two examples teach in more detail the preparation of high solids, emulsion type pigmented coatings and their application for the protection of metal surfaces. This procedure was employed in preparing the coatings exemplified in Tables I and II. These coatings are particularly effective in protecting surfaces exposed to water and/or organic solvents. The polymerizations were carried out in 32 oz. glass bottles, each fitted with a metal cap and a rubber gasket. The rate of conversion was determined by the progressive increase in total solids content of the latex.

*Example I—(GNV-111-14B)(JNV-111-58B)*

Step I:                                                         Pts. by wt.
Vinylidene chloride _____ 90
Acrylonitrile _____ 10
Daxad #11 (77%)* _____ 0.4 (0.3 active)
Water _____ 125.0
Potassium persulfate _____ 1.0
Sodium bisulfite** _____ 0.5

*Polymerized sodium salt of alkylnaphthalene sulfonic acid.
**90% purity.

The monomers were premixed and added to the bottle. The persulfate and emulsifier were added then as a water solution followed by the bisulfite. The bottle was flushed with nitrogen, capped and rotated 2 to 3 hours at 60° C.

Step II (added to bottle of above latex):       Pts. by wt.
Butadiene _____ 20.0
Acrylonitrile _____ 10.0
Vinylidene chloride _____ 10.0
Daxad #11 (77%)* _____ 0.2 (0.15 active)
Water _____ 15.0
Ammonium persulfate _____ 0.5
Sodium bisulfite** _____ 0.125

*Polymerized sodium salt of alkylnaphthalene sulfonic acid.
**90% purity.

The bisulfite, persulfate and emulsifier were added as a water solution to the latex obtained in Step I. The vinylidene chloride and acrylonitrile were then added as a mixture followed by the butadiene. The bottle was capped and rotated 2 hours at 60° C. to essentially quantitative conversion. Total solids assayed 48.2 wt. percent.

*Formulation of latex paint*

The following ingredients were added to 100.0 g. (dry basis) of the latex prepared in accordance with the teachings of the above example:

Ingredient (solutions):                        Pts. by wt.
Daxad #11 (10% by wt.) _____ 2.0 (0.2 active)
Polyacrylamide (2% by wt.) ___ 25.0 (0.5 active)

The ingredients were added slowly with mild stirring of the latex. The pigmentation of the latex was accomplished by adding slowly with stirring a pigment dispersion prepared in the following manner:

*Pigment dispersion (ground 16–24 hrs. in a pebble mill)*

Ingredients:                                   Pts. by wt.
Dixie clay _____ 10.0
Iron Oxide Red-S Pigment*** _____ 2.0
Daxad #11 (10%)* _____ 0.5 (0.05 active)
Polyacrylamide-200 (2%)** ___ 20.0 (0.4 active)

*Polymerized sodium salts of alkylnaphthalene sulfonic acid, a trademarked product.
**Polyacrylamide, a commercial product.
***Red Oxide 3121, a commercial product.

*Example II (GNV-111-4A)(JNV-111-56A)*

Step 1:                                        Pts. by wt.
Vinylidene chloride _____ 90
Acrylonitrile _____ 10
Dibutyl fumarate _____ 5.0
Daxad #11 (77%)* _____ 0.4 (0.3 active)
Water _____ 125.0
Potassium persulfate _____ 1.0
Sodium bisulfite (pure dry)** _____ 0.5

The monomers were premixed and added to a bottle followed by the persulfate, emulsifier and bisulfite in that order. The bottle was flushed with nitrogen, capped and rotated 2 to 3 hours at 60° C.

Step II (added to bottle of above latex):       Pts. by wt.
Vinylidene Chloride _____ 45.0
Acrylonitrile _____ 5.0
Hexyl Methacrylate _____ 10.0
Daxad #11 (77%)* _____ 0.2 (0.15 active)
Ammonium Persulfate _____ 0.5
Sodium Bisulfite (pure, dry)** _ 0.125

*Polymerized sodium salts of alkyl naphthalene sulfonic acid, a commercial product.
**Ca. 90% purity.

The bisulfite, persulfate and emulsifier were added as a water solution to the latex obtained from Step I. The vinylidene chloride, acrylonitrile and hexyl methacrylate were pre-mixed and added to the latex. The bottle was capped and rotated 4 hours at 60° C. to essentially quantitative conversion. The total solids content of the latex was found to be 51.2 wt. percent.

*Formulation of latex paints*

The following ingredients were added to 100.0 g. (dry basis) of the latex prepared in accordance with the teachings of the above example:

Ingredient (solutions):                        Pts. by wt.
Daxad #11 (10%) _____ 5.0 (0.5 active)
Hydroxyethyl cellulose (1%) _____ 6.0 (0.06 active)

The ingredients were added slowly to the above latex with mild stirring. The pigmentation of the latex was accomplished by adding slowly with stirring a pigment dispersion prepared in the following manner:

*Pigment dispersion (ground 16–24 hrs. in a pebble mill)*

Ingredients:                                   Pts. by wt.
Iron Oxide Red-S Pigment *** _ 10.0
Daxad #11 (10%) * _____ 1.5 (0.15 active)
Hydroxyethyl cellulose (1%) ** 4.0 (0.04 active)
Sodium phosphate (tribasis)
    (10%) _____ 0.2 (0.02 active)
Water _____ 1.25

*Polymerized sodium salts of alkyl naphthalene sulfonic acid, a commercial product.
**Cellosize WP-4400, a commercial product.
***Red Oxide #3121, a commercial product.

The formulated coatings were applied to sand-blasted medium tensile hull steel panels with a DeVilbiss No. P-EGA-502 spray gun at 30–40 p.s.i. A drying period of one to twenty-four hours was allowed between coats to minimize the possibility of water entrapment under the coatings. Three to four coats were required to obtain a coating thickness of about six mils.

The applied coatings were evaluated in the accelerated total immersion test (B) described above.

The coatings prepared in accordance with the teachings of Examples I and II showed no deterioration after ten repetitions of the above testing procedure.

The bodying agents useful in the present invention were hereinbefore discussed. Of these it is preferred to use a hydroxyethylcellulose (exemplified by Cellosize WS and WP-4400), polyacrylamide (exemplified by PAM-50, -75, -100 and -200), carboxy vinyl polymers (exemplified by acrylic acid-styrene, methacrylic acid-styrene, methacrylic acid-styrene-butadiene, maleic anhydride-styrene copolymer, methacrylic acid-styrene copolymers and maleic anhydride-vinyl chloride copolymers, maleic anhydride-methyl vinyl ether copolymer, the Carbopol polymers), polyvinylpyrrolidone (exemplified by PVP), and a natural gum exemplified by gun arabic or acacia.

Finally, it was demonstrated in further examples that vinylidene cyanide could be susbtituted for part or all of the vinylidene chloride or vinylidene fluoride in one of the component mixtures of the interpolymer of the latices of Tables I and II, the water and solvent resistance being particularly good, for example, when step (1) polymerizes vinylidene cyanide-vinylidene chloride-acrylonitrile(10–80–10) mixture and step (2) polymerizes 40 parts of a film forming component, e.g., butadiene-acrylonitrile (60–40) mixture.

Thus, it has been demonstrated that multi-step sequential polymerization of mixtures of polymerizable olefinic monomers can be conducted to give latices of film-forming interpolymers the polymer content being high (40 to 60% solids) and substantially free of emulsifiers (from 0 to 0.5%), by procedures of the present invention, which provides for the polymerization in at least one step of a vinylidene component selected from vinylidene chloride, fluoride and cyanide, and the sequential polymerization of mixtures of monomers at least one mixture of which contains a water-soluble monomer. Further, it was exemplified that such high solids latices can be pigmented with organic and inorganic pigments employing from 3 pts. to 150 pts. or more pigment per 100 pts. interpolymers, and bodied by use a water-soluble polymeric material such as natural gums (e.g., gumarabic) and synthetic material such as polyacrylamide, hydroxyethylcellulose, polyvinylpyrrolidone, or a carboxyvinyl polymer.

Further such latices can be additionally plasticized just prior to or even after incorporation of the pigment by blending in small amount of plasticizers such as chlorinated biphenyls (containing chlorine in the range of 20 to 60%, preferably 20 to 25%), alkyl esters such as dibutyl phthalate, dibutyl adipate or sebacate, acetyl tributyl citrate, paraplex G-60 (a polymeric acrylic ester), and the like, such plasticizers aiding in obtaining more flexible films. However, for applications requiring high solvent- and water-resistance, it is preferred to omit the plasticizers and to obtain the flexibility by adjustment of the monomer compositions in the sequentially performed polymerization steps, e.g., by (a) inclusion of butadiene, dialkyl fumarate or maleate, alkylacrylates, alkyl methacrylates and the like or (b) adjustment of the vinylidene/acrylonitrile ratio to the range of 87/13 to 93/7.

latex polymer coating composition for use in coating

The use of the present invention provides a water base surfaces for protection against organic solvents and water, particularly sea water, and further provides a non-hazardous and non-toxic type of coating for conventional methods of application thereof.

By the term "interpolymers" as used herein is meant the polymerized products of the two or more sequential polymerizations of one or more mixtures of polymerizable olefinic monomers in a latex of polymerized monomer or mixture of monomers said polymerization being conducted by a free-radical generating system. Thus the term interpolymers includes conventional graft polymers and block polymers, and conjunctive polymers, conjunctive polymers indicating the product of polymerization of a monomer or monomer mixture in the presence of a preformed polymer.

The term "core polymer" indicates the polymer present prior to each succeeding polymerization step. "Essentially emulsifier-free latex" cannotes the polymer latices produced when employing a water-soluble monomer (solubility ranging from less than 1% by wt. solubility to complete miscibility) with no added emulsifier, or with amounts of emulsifier up to and slightly exceeding the critical micelle concentration (point of incipient micelle formation) up to about 0.5% concentration based on the polymer contents of the latices. By polymerizable olefinic monomers is meant any monomer containing and polymerizable through one or more unsaturated "carbon to carbon" ethenoid linkage conventionally represented by $>C=<$. By a halo-vinylidene monomer is meant 1,1-disubstituted ethylene represented by

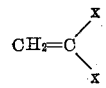

wherein $x$ is a halogen or pseudohalogen.

While there have been described herein what are at present considered to be preferred embodiments of the invention, it will be obvious to those skilled in the art that minor modifications and changes may be made without departing from the essence of the invention. It is therefore to be understood that the exemplary embodiments are illustrative and not restrictive to the invention, the scope of which is defined in the appended claims, and that all modifications that come within the meaning and range of equivalency of the claims are intended to be included therein.

We claim:
1. The process for producing an interpolymer coating composition in aqueous dispersion by at least two sequential steps of addition polymerization of monomer materials which contain and are polymerizable through at least one ethenoid group, in the presence of a free radical polymerization catalyst; which process comprises
   (a) dispersing, in an aqueous medium containing a free radical polymerization catalyst and from 0.0 to 0.5% by weight of an emulsifier based on the weight of said monomer materials, from 50 to 97% butadiene and from 3 to 50% of acrylonitrile,
   (b) polymerizing said monomer materials in a first step to produce a polymer thereof in said aqueous dispersion,
   (c) dispersing at least two different such monomer materials in said aqueous dispersion of said produced polymer,
   (d) polymerizing said monomer materials with said polymer in said aqueous dispersion in the presence of a free radical polymerization catalyst and from 0.0 to 0.5% by weight of an emulsifying agent based on the weight of the polymer and monomer in step (c), in a second step,
   (e) one of said monomer materials in at least one of said polymerization steps being vinylidene monomer material selected from the group consisting of vinylidene fluoride, vinylidene chloride, and vinylidene cyanide, and mixtures of the foregoing,
   (f) the polymerized vinylidene monomer constituting at least 50% by weight of the total interpolymer of the composition,
   (g) the mixture of monomer materials copolymerized in said step (b) resulting in the formation of a flexible, film-forming polymer,
   (h) at least one of said polymerization steps being effected in the presence of an emulsifying agent, and
   (i) removing the resulting flexible, film-forming interpolymer composition in an aqueous dispersion having a solids content not in excess of 60%.
2. The process of claim 1 wherein the monomer materials of the second polymerization step consist of from 80 to 98 wt. percent vinylidene chloride and from 2 to 20% acrylonitrile.
3. The aqueous polymer latex produced by the process of claim 1.
4. The protective coating material composition produced by the blending (a) 100 pts. of the latex of claim

3 with (b) 5 to 100 pts. of pigment suspension in water containing from 40 to 60 parts pigments, 0.1 to 0.5 parts of surface-active suspending agent, and from 38 to 59 parts of water, and (c) from 2 to 20 parts of an aqueous solution containing from 0.1 to 2.0 pts. of at least one bodying agent selected from the group consisting of polyacrylamide, hydroxyethylcellulose, carboxy vinyl polymer, polyvinylpyrrolidone and natural gum.

5. The product of claim 4 wherein at least one pigment employed is selected from the group consisting of iron oxide, lead cyanamide, titania, wollastonite, and mixtures thereof.

References Cited by the Examiner

UNITED STATES PATENTS

| | | | |
|---|---|---|---|
| 2,614,089 | 10/1952 | Harrison et al. | 260—879 |
| 2,840,447 | 6/1958 | Green | 260—879 |
| 2,894,927 | 7/1959 | Elder et al. | 260—879 |
| 2,996,469 | 8/1961 | Cole et al. | 260—29.7 |

OTHER REFERENCES

Willis, Industrial and Engineering Chemistry, volume 41, No. 10, pages 2272–2276, October 1949.

Whitby et al., Journal of Polymer Science, volume 16, pages 549–576, 1955.

Textile Chemical and Auxiliaries, H. C. Speel, Rheinhold Co., New York, 1952.

"Vinyl and Related Polymers," C. E. Schildknecht, Wiley, New York, 1952.

MURRAY TILLMAN, *Primary Examiner.*

DAN ARNOLD, LEON J. BERCOVITZ, J. W. SANNER J. ZIEGLER, *Assistant Examiners.*